March 31, 1964 L. B. BORST 3,127,321
NUCLEAR REACTOR FOR A RAILWAY VEHICLE
Filed April 7, 1955 3 Sheets-Sheet 1

INVENTOR.
LYLE B. BORST
BY
ATTORNEY

March 31, 1964  L. B. BORST  3,127,321
NUCLEAR REACTOR FOR A RAILWAY VEHICLE
Filed April 7, 1955  3 Sheets-Sheet 2

INVENTOR.
LYLE B. BORST
BY
ATTORNEY

March 31, 1964  L. B. BORST  3,127,321
NUCLEAR REACTOR FOR A RAILWAY VEHICLE
Filed April 7, 1955  3 Sheets-Sheet 3

INVENTOR.
LYLE B. BORST
BY
ATTORNEY

## 3,127,321
NUCLEAR REACTOR FOR A RAILWAY VEHICLE
Lyle B. Borst, Ossining, N.Y., assignor to
University of Utah, Salt Lake City, Utah
Filed Apr. 7, 1955, Ser. No. 499,867
2 Claims. (Cl. 176—38)

My invention relates in general to the construction and operation of nuclear reactors and more particularly, to a homogeneous type nuclear reactor especially designed and particularly useful for a mobile power plant.

The design of any power reactor requires that large amounts of heat be removed from the reactor core and the necessity of obtaining good heat transfer conditions often dictates the arrangement of the reactor. From a nuclear standpoint the reactor core is desirably arranged in a geometric pattern so as to have the smallest ratio of core bounding surface to volume in order to minimize neutron escape. Such considerations have caused some of the prior reactor cores to be constructed in the general form of a sphere. Other shapes that have been used are righ circular cylinders having a length to diameter ratio greater than one and polygons having a length greater than its major cross axis.

Almost all of these reactors have been designed for low power output and have utilized solid fuel. Solid fuel or heterogeneous reactors by their construction limitations can not have a high efficiency of neutron liberation, because the fuel cladding material and the coolant heat transfer surfaces interfere with the efficient transfer of neutrons for further fission. In contrast, homogeneous type reactors, where the fissionable material is in solution, have a high neutron efficiency and are more readily adapted to geometries which deviate considerably from the above mentioned sphere.

Mobile reactors have the overriding consideration that they must be relatively small in size to fit into the available space, while releasing large amounts of heat, i.e., capacity to operate at high power densities. In units of this type the removal of heat is a major criteria for determining a design. Factors affecting the heat transfer such as uniform removal of heat throughout the core, characteristics of the heat transfer or coolant fluid, and structural limitations, are more influential design factors than the nuclear requirements.

The nuclear reactor of my invention is particularly characterized by the construction of the reactor core or fuel chamber in the shape of a right circular cylinder having an axial length to diameter ratio of less than 0.75, and with the circular end portions of the cylinder serving as tube sheets for a multiplicity of small diameter, longitudinally disposed, spaced cooling tubes which pass through the core or fuel chamber. Within the cylinder and around the tubes there is a water solution of uranium sulphate or the like.

Another feature of my invention is the provision of inlet and outlet chambers on the outer side of each tube sheet which when filled with water act as reflectors.

A further feature of my invention is that the water which is used for a reflector, can be the reactor coolant fluid and may be either boiled to generate steam or may simply be heated for a further heat transfer step in an auxiliary heat exchanger where the coolant fluid transfers heat to a vaporizable fluid for vapor generation.

A still further feature of my invention is the provision of a catalytic recombiner in which the dissociated water vapor from the fuel solution is externally recombined and then condensed by the vapor generator feed water in indirect heat exchange so as to constitute in effect a continuously refluxing condenser.

Another feature of my invention is in the use of the driving potential of the dissociated water vapor, vapor, and gaseous fission products which pass off from the liquid fuel solution, to drive a turbine which in turn drives a pump for the circulation of the fuel solution within the fuel chamber, thus increasing the heat transfer effectiveness of the fuel solution.

A further feature is in the provision of means for superheating the power plant working fluid by passing the vapor generated in cooling relation with the primary shield heated by the gamma radiations of the reactor. This arrangement gives the steam a measure of superheat, thus guaranteeing that the steam is dry and also reducing the external heat loss of the primary shield.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

Figure 1:
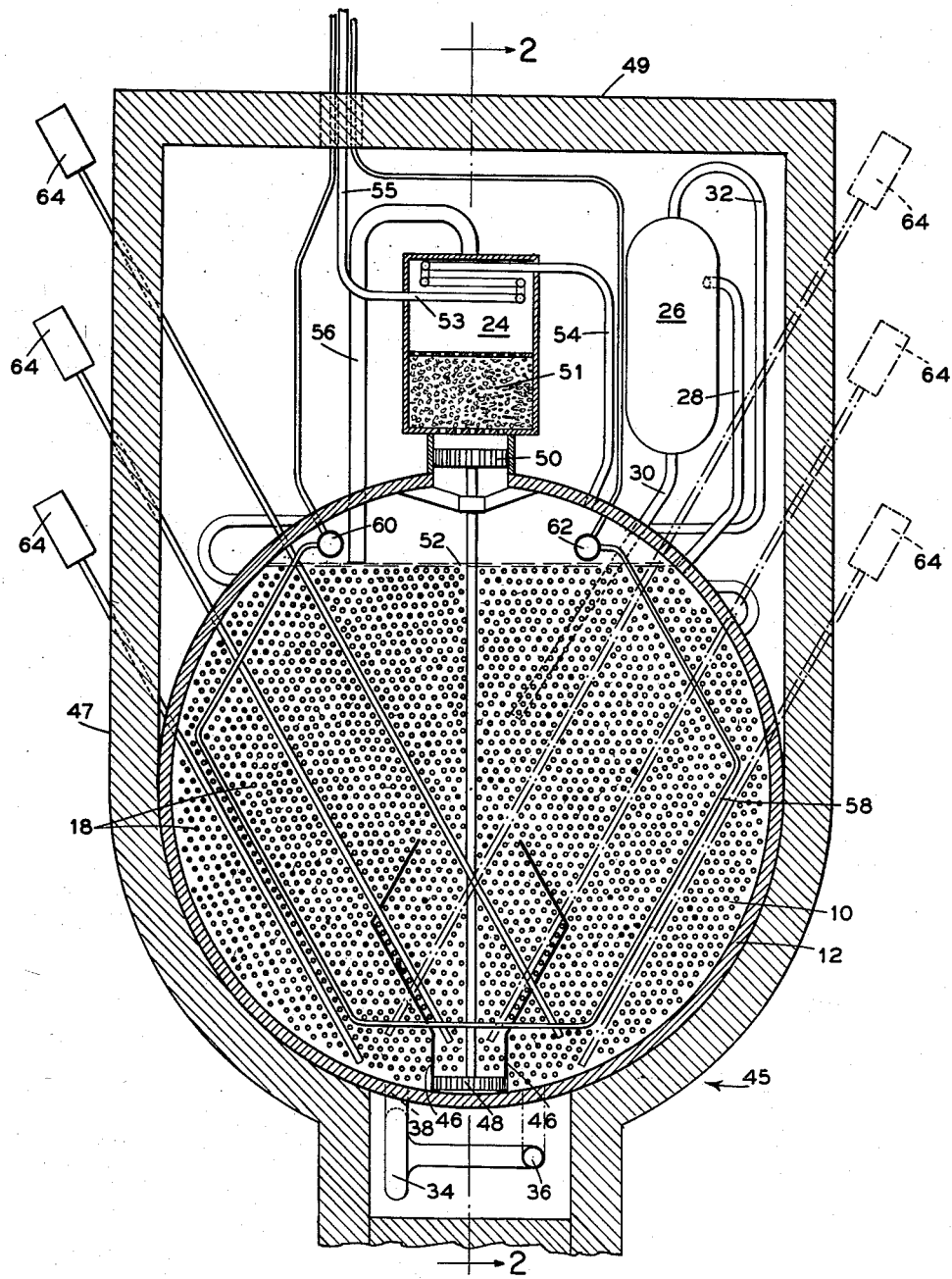
FIG. 1 is a sectional elevation through a nuclear reactor embodying the invention.
Figure 2:
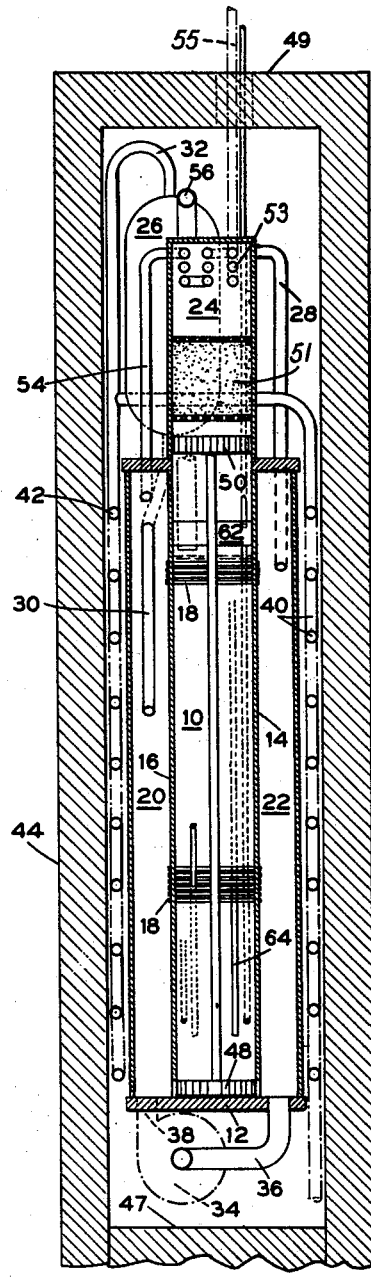
FIG. 2 is a transverse section taken on the line 2—2 of FIG. 1.
Figure 3:
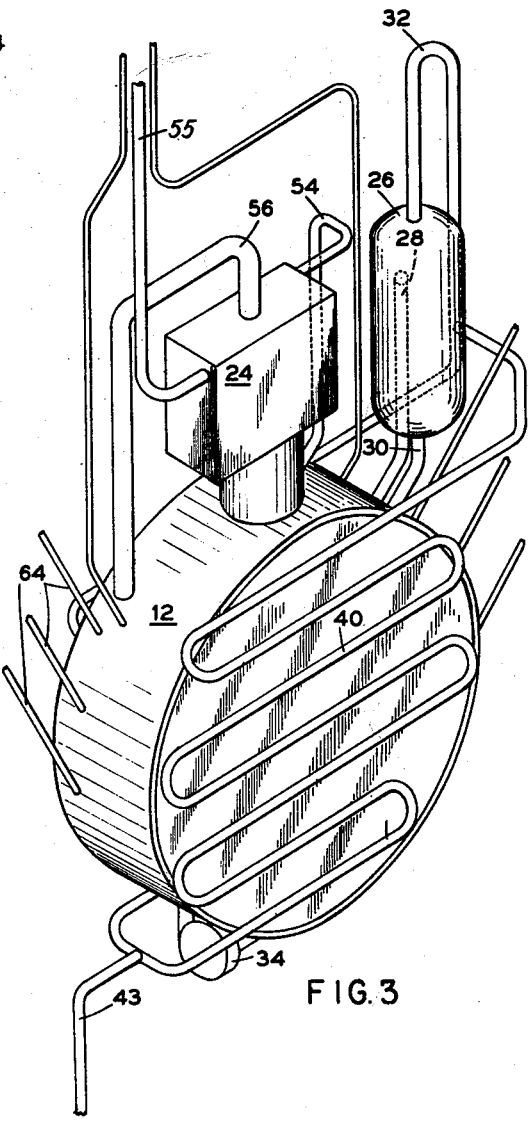
FIG. 3 is an isometric drawing of the exterior of the reactor with the shell removed.

The nuclear reactor illustrated utilizes a homogeneous solution of uranium sulphate in light water, with the reactor being cooled by heating light water under forced circulation at a vaporizing temperature. The reactor has a fuel chamber 10 formed by a cylindrical pressure wall 12, a pair of spaced circular tube sheets 14 and 16 arranged to close the ends thereof, and a multiplicity of small diameter coolant tubes 18 extending between and opening through said tube sheets. Disposed at opposite ends of the cylindrically shaped fuel chamber are a cylindrically shaped fuel chamber are a cylindrical coolant inlet chamber 20 and a cylindrical coolant outlet chamber 22. Directly above the fuel chamber 10 and in communication with it, is a catalytic recombiner chamber 24. Adjacent the recombiner chamber 24 is a separate external steam separator 26 which has a riser 28 in communication with the outlet chamber 22, a downcomer 30 connected to the coolant inlet chamber 20, and a vapor outlet line 32. Subjacent the cylindrical fuel chamber is a coolant pump 34 arranged to force-circulate the coolant fluid from the outlet chamber 22 via the suction line 36 to the coolant inlet chamber 20 via line 38. Disposed adjacent to but spaced from the outer sides of inlet and outlet chambers are two parallel steam superheater sections 40 and 42, each being formed in a sinuous tube bank in thermal contact with a vertical end wall 44 of the primary shielding structure 45, formed of steel, e.g., 8" thick. The shielding 45 is completed by a U-shaped side wall 47 and and roof 49 connected to the end walls 44, and the entire reactor is disposed within the shielding.

Within the fuel chamber 10 are a pair of spaced vertically arranged fuel circulation baffles 46 which assist in guiding the circulation of the liquid fuel. Arranged to take suction from the liquid fuel contained between the baffles 46 is a fuel circulating pump 48. This pump is driven by a turbine 50 which receives its driving energy from the dissociated water vapor, vapor, and fission gases which rise off of the liquid fuel surface indicated at 52 and pass into the recombiner chamber 24. Immediately upon entering the chamber 24 the dissociated water vapor first passes through a body of catalyst 51 which may be activated platinum, where the hydrogen and oxygen is recombined in an exothermic process. The released heat superheats the fission gases and water vapor. The condensible vapor is then partly condensed by a condenser coil 53 in the upper end of the chamber 24. The cooling fluid for the condenser coil is the vapor generator feed water which enters the recombiner chamber by the line 55 and is discharged by the line 54 into the reactor inlet coolant chamber 20. The condensed water is carried out of the recombiner through the line 56 and returned to the fuel chamber 10 to maintain the liquid fuel level therein. Disposed within the fuel chamber 10 are emergency cooling heat transfer tubes 58 having their opposite ends connected to inlet and outlet headers 60 and 62. On the occurrence of a predetermined condition, an emergency cooling fluid can be forced through the cooling loop 58 from an external source (not shown) in order to remove the reactor decay heat.

The reactor is controlled to maintain a predetermined fuel temperature, thus changes in this temperature would change the power output. Control rods 64 are adapted to be reciprocably moved according to the proper control signal by any of the presently known control systems for reactors.

In the operation of this reactor control rods 64 are moved until the reactor goes critical. The reactor coolant circulating pump 34 is started so that the light water coolant is circulated from the inlet chamber 20 through the tubes 18 into the outlet chamber 22 and then back to the pump, until a steaming condition is reached. Then a control valve (not shown) on the outlet 43 of the superheater 40, 42 would be opened. The steam which is generated as it passes through the reactor coolant tubes 18 passes up the steam riser tube 28 into the steam and water separator 26. The separated water passes down the downcomer into the inlet chamber 20 and the separated steam passing into the superheater sections 40 and 42. As the steam passes through the superheater, which is in contact with the primary shielding 44, the steam picks up a small degree of superheat in cooling the shield end walls 44, which in turn receive heat from the gamma radiations from the reactor. Thus there is generated steam for the prime mover in a homogeneous type boiling reactor.

Figure 4:
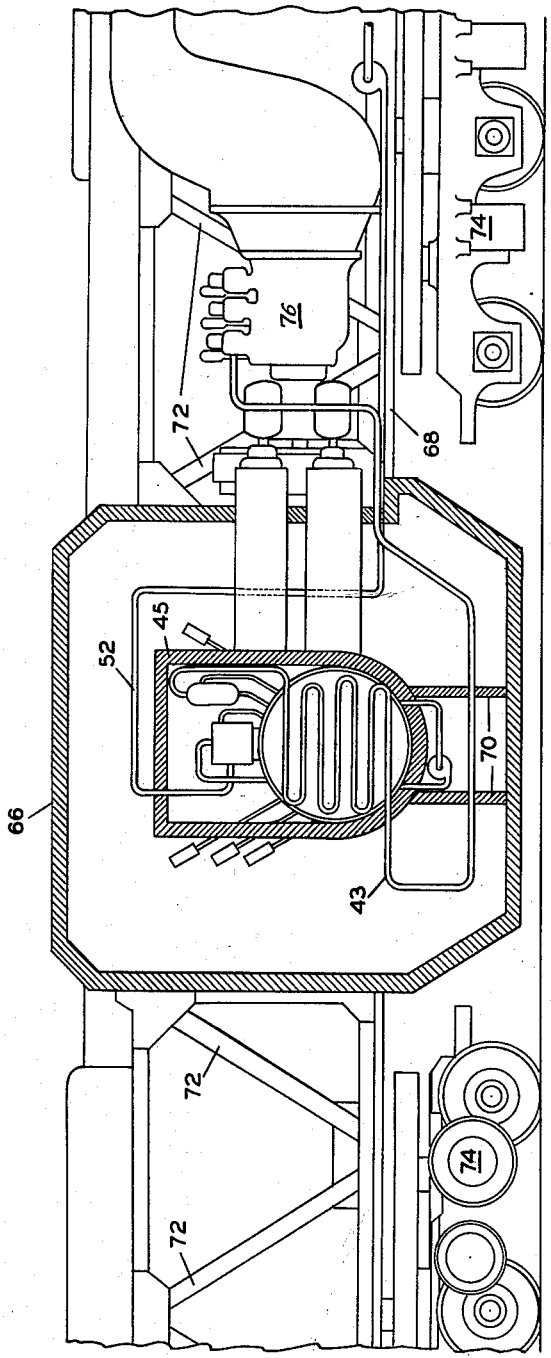
FIG. 4 is a view of the reactor as mounted in a locomotive.

In FIG. 4 there is shown a specific application of my mobile reactor as used as a power source for a railway locomotive. The reactor, which is within the primary shield 45, is centrally located within a large shielding chamber formed by the secondary shield 66. The reactor is arranged therein with the fuel chamber major axis in a plane coincidental with the longitudinal axis of the locomotive underframe 68, thus providing the maximum shielding distance between the primary shield 45 and the secondary shield 66. The reactor and the primary shield are supported on the pedestals 70 which in turn rest on the secondary shield 66. The secondary shield, also being of 8" thick steel, constitutes a center panel of a heavy duty bridge truss 72 which allows the weight of the reactor to be transmitted to and carried by the traction assembly 74. The secondary shield is also arranged to utilize to a maximum extent the allowable width of the railway car underframe, the outer sides of the shield being in substantial vertical alignment with the side edges of the underframe. In one such case, the outer dimensions of the secondary shield were 10 feet wide, 15 feet long and 15 feet high. The space between the inner primary shield and the outer secondary shield is filled with a shielding material, which is approximately one-half steel and one-half hydrogenous material of about unit density, which gives the shield a total weight of approximately 400,000 pounds. Under emergency conditions, such as wrecks, the presence of a shielding material of high viscosity between the inner and the outer shield structures is advantageous in effecting the deceleration of the internal or primary shield 45 within the secondary shield 66. Such a material would be a hydrocarbon which is high in hydrogen content.

The steam from the reactor flows from the superheated steam outlet 43 into a steam turbine 76 which drives conventional railway electrical generating equipment and which in turn drives the electric traction motors of a well known type on the carriages 74.

By way of example, and not of limitation, one locomotive reactor of the character described was designed with a fuel chamber dimension of 3 feet diameter and 10 inches in length, and containing 10,000 ¼ inch tubes. Table I shows the designed operating conditions of the locomotive.

TABLE I

*Operating Conditions*

| | |
|---|---|
| Reactor heat generating (continuous) | 30,000 kw. |
| Steam pressure (saturated) | 250 p.s.i. |
| Reflector temp. | 405° F. |
| Fuel solution temp. | 460° F. |
| Turbine exhaust pressure | 6" Hg. |
| Steam flow | 120,000 lb./hr. |
| Turbine power (continuous) | 8,000 H.P. |
| Cycle efficiency | 20%. |

The reactor characteristics of the locomotive type is shown in Table II below.

TABLE II

*Nuclear Operating Data*

| | | |
|---|---|---|
| (a) | Homogeneous solution | $UO_2SO_4$. |
| (b) | $H/U^{235}$ atomic ratio | 700. |
| (c) | $H_2O/U^{235}$ weight ratio | 27. |
| (d) | $U^{235}$ | 9.0 kg. |
| (e) | $UO_2SO_4$ weight | 13.9 kg. |
| (f) | $H_2O$ required | 243 kg. |
| (g) | Assumed density of solution | 1.0 g./cm.$^3$. |
| (h) | Solution circulation rate | 500 g.p.m. |
| (i) | Reflector circulation rate | 2000 g.p.m. |
| (j) | Solution pressure | 650 p.s.i.g. |
| (k) | Reflector pressure | 250 p.s.i.g. |
| (l) | Power generated | 30,000 kw. |
| (m) | Excess reactivity | 10%. |
| (n) | $H_2O$ decomposition rate | 32 g./sec. |
| (o) | Solution temperature | 460° F. |
| (p) | Reflector temperature | 405° F. |

The inlet and outlet chambers 20, 22 by their construction and arrangement are especially adapted to act as a neutron reflector, and by virtue of the described geometric arrangement of the fuel chamber they cover a large portion of the surfaces of the fuel chamber, thus contributing to the neutron conservation of the reactor.

The geometric configuration of the fuel chamber, being a right circular cylinder with a length to diameter ratio of considerably less than 0.75, makes possible the use of short longitudinally disposed cooling tubes so as to allow operation of the reactor at a high power density with the boiling cooling water having a short flow path, thus holding the volume of steam generated in each tube during its traversing of the fuel chamber to a minimum. This allows the boiling water to maintain its high heat transfer effectiveness without the large reactivity change which would occur with large amounts of steam in each tube.

The integral turbine and pump arrangement in the fuel chamber of the reactor provides for a forced circulation of the liquid fuel by utilizing the heretofore wasted energy of the dissociated vapor and fission gases as they travel to the catalytic recombiner and results in highly improved heat transfer conditions within the fuel chamber. The condenser part of the recombiner operates as an economizer for heating the feed water and thus increases the efficiency of the working cycle.

While in accordance with the provisions of the statutes I have illustrated and described herein the best form of the invention now known to me, those skilled in the art will understand that changes may be made in the form of the apparatus disclosed without departing from the spirit of the invention covered by the claims, and that certain features of the invention may sometimes be used to advantage without a corresponding use of other features.

I claim:

1. A radiation shielding arrangement for a high energy nuclear radiation source in a railway vehicle comprising a railcar underframe, said radiation source in the form of a right circular cylinder of a length to diameter ratio of less than one and arranged with its major axis in a plane coincidental with the longitudinal axis of said underframe, a radiation shield vessel enveloping said source and mounted on said underframe with the vertical external sides of said shield being in vertical alignment with the side edges of said underframe, a second fluid-tight radiation shield vessel closely surrounding said source internally of and spaced from said first named shield vessel, a high viscosity fluid filling the space between the shield vessels having the ability to decelerate any movement of said internal vessel, and a hydrogenous material placed in said high viscosity liquid to increase the shielding effect of the liquid.

2. A radiation shielding arrangement for a high energy nuclear radiation source in a railway vehicle comprising a railcar underframe, said radiation source in the form of a right circular cylinder of a length to diameter ratio of less than one and arranged with its major axis in a plane coincidental with the longitudinal axis of said underframe, a radiation shield vessel enveloping said source and mounted on said underframe with the vertical external sides of said shield being in vertical alignment with the side edges of said underframe, a second fluid-tight radiation shield vessel closely surrounding said source internally of and spaced from said first named shield vessel, a vapor superheater in heat transfer relationship to the interior surface of said second radiation shield, means for passing vapor through said superheater to remove heat from said shield surface and effect the superheating of said vapor, a high viscosity fluid filling the space between the shield vessels having the ability to decelerate any movement of said internal vessel, and a hydrogenous material placed in said high viscosity liquid to increase the shielding effect of the liquid.

References Cited in the file of this patent

UNITED STATES PATENTS 2,708,656     Fermi et al. _____ May 17, 1955

OTHER REFERENCES

AECD–3287, February 7, 1952, 17 pages, Technical Information Service, Oak Ridge, Tenn.

"Nucleonics," vol. 12, No. 3, pp. 78 and 80. March 1954.

U.S. Atomic Energy Commission AECD–3065, September 19, 1945, pp. 1–28.

Applied Atomic Power by E. S. C. Smith et al., Prentice-Hall, N.Y., 1946, pp. 160–169.

Business Opportunities in Atomic Energy. Proceedings of a meeting March 15 and 16, 1954, Biltmore Hotel, New York, N.Y., pub. by Atomic Industrial Forum, Inc., 260 Madison Ave., New York 16, N.Y., © May 1954. (Editors of report: Oliver Townsend, Edwin Wiggins, pp. C2 to C15.)